United States Patent
Malkawi et al.

(10) Patent No.: US 9,131,509 B2
(45) Date of Patent: Sep. 8, 2015

(54) MECHANISM FOR GROUP POLLING WITHOUT PRECISE TIMING

(71) Applicants: Mohammad Isam Malkawi, Chicago, IL (US); Ashraf Nusairat, Hoffman Estates, IL (US); Basman Dahleh, Palos Heights, IL (US)

(72) Inventors: Mohammad Isam Malkawi, Chicago, IL (US); Ashraf Nusairat, Hoffman Estates, IL (US); Basman Dahleh, Palos Heights, IL (US)

(73) Assignee: CAMBIUM NETWORKS LIMITED, Devon (GB)

( * ) Notice: Subject to any disclaimer, the term of this patent is extended or adjusted under 35 U.S.C. 154(b) by 168 days.

(21) Appl. No.: 13/857,818

(22) Filed: Apr. 5, 2013

(65) Prior Publication Data

US 2014/0301374 A1 Oct. 9, 2014

(51) Int. Cl.
| | | |
|---|---|---|
| H04W 74/06 | (2009.01) | |
| H04W 72/04 | (2009.01) | |
| H04L 12/413 | (2006.01) | |
| H04L 12/54 | (2013.01) | |
| H04W 16/28 | (2009.01) | |

(52) U.S. Cl.
CPC ............ *H04W 74/06* (2013.01); *H04W 72/046* (2013.01); *H04L 12/413* (2013.01); *H04L 12/56* (2013.01); *H04W 16/28* (2013.01)

(58) Field of Classification Search
None
See application file for complete search history.

(56) References Cited

U.S. PATENT DOCUMENTS

| | | | |
|---|---|---|---|
| 5,539,882 A | 7/1996 | Gopal et al. | |
| 5,737,330 A | 4/1998 | Fulthorp et al. | |
| 6,430,193 B1 * | 8/2002 | Raissinia et al. | 370/448 |
| 7,006,530 B2 | 2/2006 | Spinar et al. | |
| 7,545,791 B2 | 6/2009 | Malik et al. | |
| 7,596,113 B1 * | 9/2009 | Kingston et al. | 370/320 |
| 7,664,085 B2 | 2/2010 | Waxman | |
| 8,259,655 B2 | 9/2012 | Choe et al. | |
| 8,315,640 B2 | 11/2012 | Stanwood et al. | |
| 2003/0076809 A1 | 4/2003 | Basil et al. | |
| 2003/0198244 A1 | 10/2003 | Ho et al. | |
| 2004/0042431 A1 * | 3/2004 | Ishikawa | 370/337 |
| 2005/0043045 A1 * | 2/2005 | Cheng et al. | 455/502 |
| 2005/0135317 A1 | 6/2005 | Ware et al. | |

(Continued)

FOREIGN PATENT DOCUMENTS

| | | |
|---|---|---|
| EP | 1 814 344 A1 | 8/2007 |
| GB | 2 232 041 A | 11/1990 |
| WO | WO 2006/044744 | 4/2006 |

OTHER PUBLICATIONS

Y. Fang, et al. On the Performance Enhancement of Wireless LAN—A Multi-polling Mechanism with Hidden Terminal Solution, Global Telecommunications Conference, 2005. Globecom '05, (IEEE) Nov. 28-Dec. 2, 2005, found online at www.merl.com/reports/docs/TR2005-157.pdf, 5 pages.

(Continued)

*Primary Examiner* — Chi H Pham
*Assistant Examiner* — Vladislav Agureyev
(74) *Attorney, Agent, or Firm* — Brinks Gilson & Lione

(57) ABSTRACT

In a wireless communication network, to reduce the polling overhead it is proposed to poll several stations using the same polling frame. In order to be able to poll more than one station in the same frame, an access point can make use of the locations of stations relative to the access point. The location of each station relative to the access point will cause a different propagation delay for radio communications between the station and the access point. Based on the propagation delays, two or more stations may be grouped together for subsequent transmissions to the access point.

17 Claims, 7 Drawing Sheets

(56) References Cited

U.S. PATENT DOCUMENTS

| | | | |
|---|---|---|---|
| 2005/0135410 A1* | 6/2005 | Stephens | 370/449 |
| 2005/0136910 A1 | 6/2005 | Li et al. | |
| 2008/0261658 A1* | 10/2008 | Jin et al. | 455/562.1 |
| 2009/0006641 A1* | 1/2009 | Yaqoob et al. | 709/231 |
| 2009/0059962 A1* | 3/2009 | Schmidt et al. | 370/503 |
| 2010/0045508 A1* | 2/2010 | Ekbal et al. | 342/145 |
| 2011/0158159 A1 | 6/2011 | Gong et al. | |
| 2012/0008572 A1 | 1/2012 | Gong et al. | |
| 2013/0229996 A1* | 9/2013 | Wang et al. | 370/329 |
| 2013/0242825 A1* | 9/2013 | Farhadi et al. | 370/311 |
| 2013/0286959 A1* | 10/2013 | Lou et al. | 370/329 |
| 2014/0256347 A1* | 9/2014 | Lakhzouri et al. | 455/456.1 |

OTHER PUBLICATIONS

S. C. Lo, et al. An Efficient Multipolling Mechanism for IEEE 802.11 Wireless LANs, IEEE Trans. Computers, Jun. 2003, pp. 764-778.

Combined Search and Examination Report dated Mar. 25, 2014, for corresponding Great Britain Patent Application No. GB1320595.0, 5p.

International Search Report and Written Opinion for related application No. PCT/GB2014/051046, dated Aug. 11, 2014, 11 p.

* cited by examiner

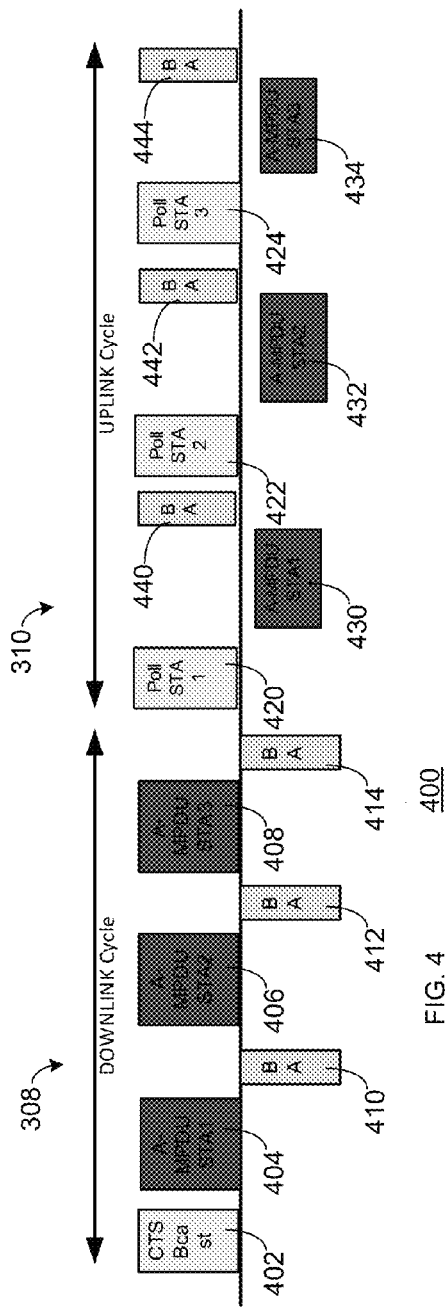
FIG. 4
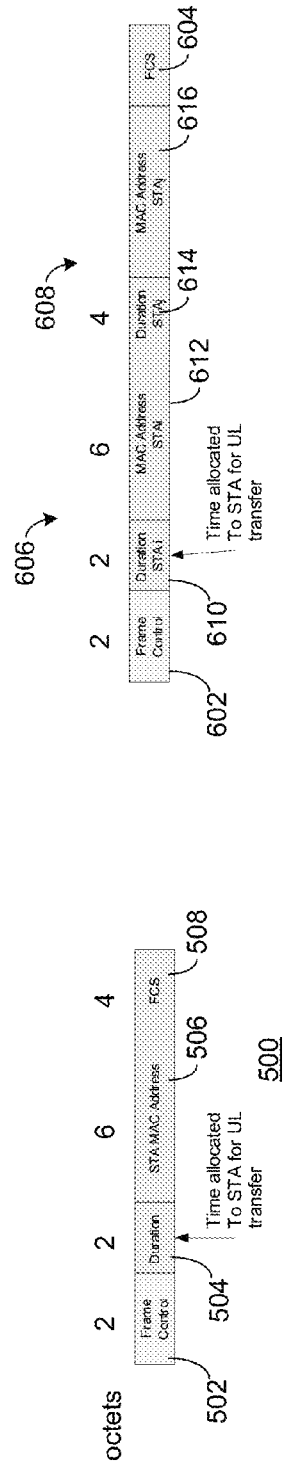
FIG. 5
- PRIOR ART -
FIG. 6

MECHANISM FOR GROUP POLLING WITHOUT PRECISE TIMING

BACKGROUND

The present invention relates generally to communication systems. The present invention relates more particularly to a mechanism for group polling without precise timing in a communication system.

Wireless broadband networks have become very popular for data communication. Such networks may be set up relatively inexpensively and quickly. Such networks may provide local communication among network client devices through an access point which controls communication in the network. Instead, or in addition, such networks may provide communication access to remote networks including the Internet.

The Institute of Electrical and Electronics Engineers (IEEE) has promulgated several data communication standards which have subsequently been adopted by industry. One example of a family of such standards is commonly referred to IEEE 802.11. IEEE 802.11 includes several protocols including IEEE 802.11a, IEEE 802.11b, IEEE 802.11g and IEEE 802.11n. 802.11 networks and devices are commonly referred to as WiFi devices. The 802.11 protocols define devices and operations that may communicate in a network, including messaging and timing. According to the protocols, an access point or base station controls data communication including timing of communication between the access point and respective stations or client devices in a service area around the access point. Client devices operate according to the same protocol to communicate with the access point. Messaging is defined by the protocol.

To improve the utility of these networks, manufacturers have been expanding the range of communication and thus the size of the service area. Initially, WiFi communication was limited to line of sight or a few tens of meters between transmitter and receiver. More recently, networks are being developed with a service area radius or node size of 5 to 15 km.

Increasing the scale of networks in this manner has met with commercial success. This success has created opportunities for additional features in systems and methods for communication as well as opportunities for improving performance and efficiency.

BRIEF SUMMARY

This disclosure relates to a synchronized WiFi network such as a network according to the Institute of Electrical and Electronics Engineers (IEEE) 802.11n standard. The network includes a plurality of access points (APs). Each AP provides wireless communication service to stations (STAs) in the vicinity of the AP. In the new network, the cell coverage may be 5 miles in diameter, compared to conventional 802.11n.

In an uplink cycle, the AP polls stations one at a time with a message. A polled STA responds by sending a message. The polling operation can consume significant network resources.

In order to reduce the polling overhead this disclosure proposes to poll several STAs using the same polling frame. In order to be able to poll more than one station in the same frame, the AP can make use of the locations of stations relative to the AP. The location of each station relative to the AP will cause a different propagation delay for radio communications between the station and the AP. Based on the propagation delays, two or more stations may be grouped together for subsequent transmissions to the AP.

BRIEF DESCRIPTION OF THE DRAWINGS

FIG. 4 timing diagram illustrating operation of the communication system of FIG. 1;

FIG. 5 timing diagram illustrating operation of a conventional communication system;

FIG. 6 timing diagram illustrating operation of the communication system of FIG. 1;

DETAILED DESCRIPTION OF THE PRESENTLY PREFERRED EMBODIMENTS

In accordance with the embodiments disclosed herein, a communication system provides apparatus and method for ensuring reliable communication, even when wireless clients are at varying distances from an access point in a wireless service area. When distances vary and are larger than a few tens of meters, propagation delay from the remote client device to the access point can be significant. When the access point is aware of the propagation delays, the access point, which controls timing of communication in the network, can make use of the propagation delay to improve efficiency in the system.

The access point may use propagation delay information to group stations or client devices in such a way that a single polling frame may be used to poll all stations of a group. A polling frame is required on each uplink for each station in the network. The access point groups together stations for which the difference in propagation delays from the stations allows a signal from one station to be completely received at the access point before beginning the receipt of the signal from another station. The overall number of polling frames may be reduced and the amount of time devoted to polling may be reduced, improving efficiency in the network.

Figure 1:
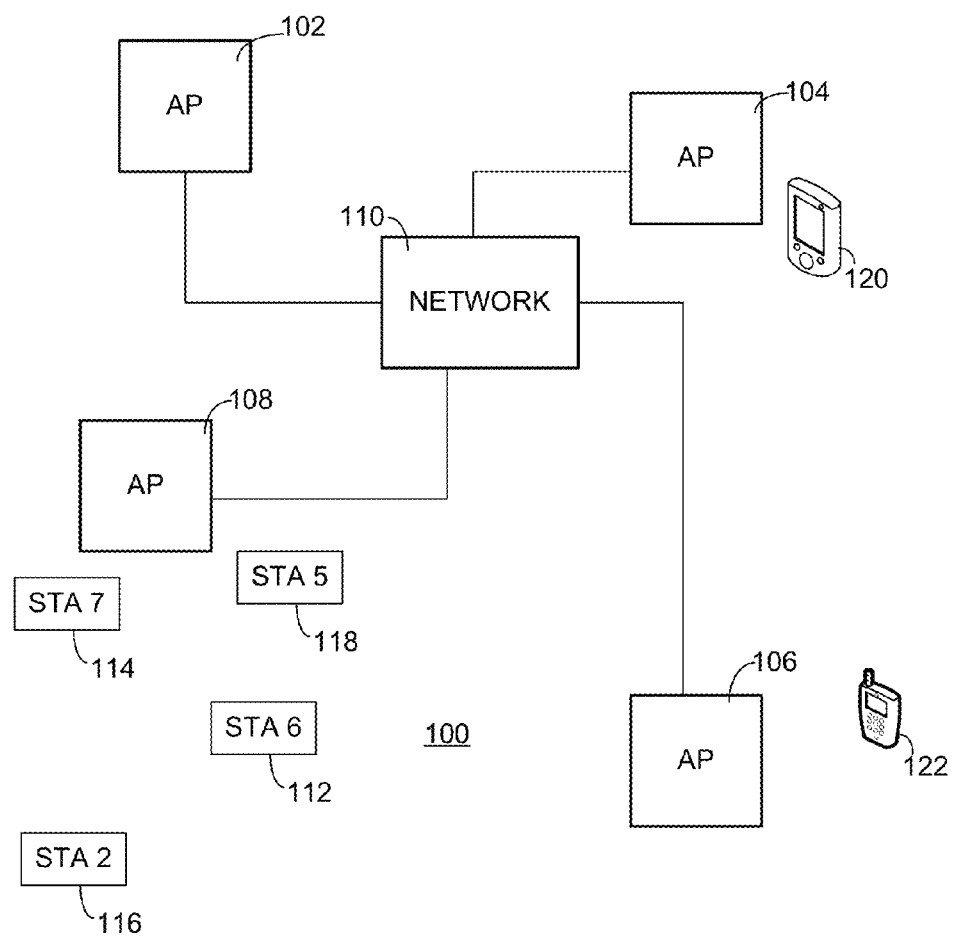
FIG. 1 is a block diagram of a communication system.

Referring now to the drawing, FIG. 1 is a block diagram of a communication system 100. The communication system 100 is intended to be exemplary only for purposes of illustrating the concepts described herein.

In this exemplary embodiment, the communication system includes a first access point 102, a second access point 104, a third access point 106 and a fourth access point 108. Each respective access point provides radio communication to a service area surrounding the respective access point. In the illustrated embodiment, each respective access point 102, 104, 106, 108 operates according to the Institute of Electrical and Electronic Engineers (IEEE) standard 802.11n, commonly referred to as WiFi. In other embodiments, one or more of the access points 102, 104, 106, 108 operates according to another wireless standard such as WiMAX or another of the family of 802.11 standards. The devices and techniques described herein may be extended to standards and protocols other than IEEE 802.11n.

In the example of FIG. 1, each respective access point operates as a base station for radio devices within a cell or service area surrounding the access point. In this example, the access point 108 provides radio communication service to one or more station near the access point. Each station (STA) communicates with the access point using a radio communication protocol such as IEEE 802.11n. The radio communication protocol defines frequency allocation, timing, frame structure and other characteristics of the transmission and reception of information between radio devices including the access point and the radio devices.

In the example of FIG. 1, the access point 108 is in radio communication with three radio devices, including a first station 112, a second station 114, a third station 116 and a fourth station 118. In this example, the first station 112 is designated STA 6, the second station 114 is designated STA 7, the third station 116 is designated STA 2 and the fourth station 118 is designated STA 5. The a first station 112, second station 114, third station 116 and fourth station 118 may be considered clients of the access point 108 and may be referred to as wireless client devices. While FIG. 1 shows four stations in communication with the access point 108, this is intended to be exemplary only. Any number of stations may communicate with the access point 108.

Each of first station 112, second station 114, third station 116 and fourth station 118 may include a radio communication circuit in combination with any other suitable device or equipment. Exemplary devices that may include a radio circuit and form a station or wireless client device include a mobile phone, a smart phone, a personal digital assistant (PDA), a laptop computer, a tablet computer, a personal computer and any other data processing device. A radio circuit provides data communication between the data processing device and the access point 108. The radio circuit may be a module or component or group of components and may be a permanent part of the station or may be removable or detachable from the station.

The access point 108 may, in turn, provide data communication between respective stations among the first station 112, second station 114, third station 116 and fourth station 118, or between a respective station and another network 110. The network 110 may be any network or combination of networks and may include directly or indirectly the Internet or networks in communication with the Internet. In the example of FIG. 1, each of the access points 102, 104, 106, 108 is in communication with the network 110. However, each of the access points 102, 104, 106, 108 may operate independently with no interaction with adjacent networks and no overall control or supervision of individual access points. In this example, second access point 104 is in data communication with a STA 120, embodied as a PDA, and the third access point 106 is in data communication with a STA 122, embodied as a mobile phone.

As is suggested by the arrangement of stations 112, 114, 116, 118 in FIG. 1, each station 112, 114, 116, 118 may be at a different distance from the access point 108. The relevant distance may be measured as a crowflight distance between the access point 108 and a respective station. Or, the distance may be measured by the length of one or more rays reflected from adjacent structures as radio energy travels between the station and the access point. Each station is a distance from the access point and the distance may vary over time if the station is mobile, such as a mobile phone or laptop computer.

The distance between a station and the access point will result in a propagation delay for communications between the station and the access point. The propagation delay may be measured as the difference between the time radio frequency (RF) energy is transmitted by one of the station and the access point and the time the RF energy is received and sensed by the other of the station and the access point. If the distance is on the order of tens of meters, the propagation delay may not be significant to timing of communication between radio circuits. On the other hand, if the distance is greater than 1 km, for example, the propagation delay may affect communication timing in the network, as will be described in greater detail below.

Figure 2:
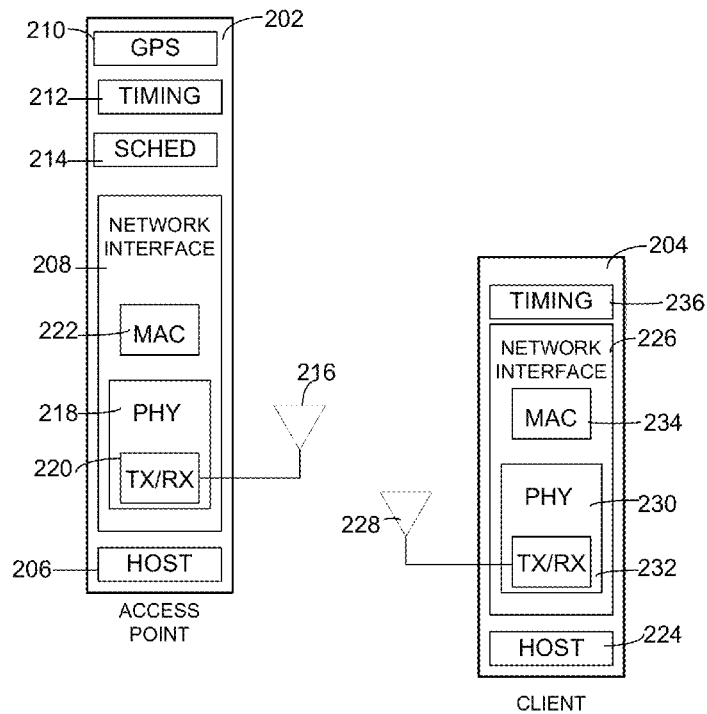
FIG. 2 is a block diagram of a representative access point and representative client device.

FIG. 2 is a block diagram of a representative access point 202 and representative client device 204. The access point 202 may be representative of one of the access points 102, 104, 106, 108 of FIG. 1. Similarly, the client device 204 may be representative of one of the stations 112, 114, 116, 118 in FIG. 1. However, the embodiments shown are intended to be exemplary only.

The access point 202 includes a host processor 206, a network interface 208, a global positioning system (GPS) circuit 210, a timing circuit 212, a scheduler 214 and an antenna 216. In other embodiments, the access point 202 may include more or fewer or alternative elements relative to those shown in FIG. 2.

The host processor 206 controls operation of the access point 202. The host processor may include one or more circuits, modules, interfaces or code for implementing control functions. For example, the host processor 206 may include a microprocessor and memory. The memory may store data and instructions for controlling the microprocessor and other components of the access point 202. The microprocessor in turn may operate in response to the stored data and instructions to control operation of the access point.

The network interface 208 controls data communication between the access point 202 and other devices, including the client device 204. The network interface 208 controls wireless communication using the antenna 216. In this regard, the network interface 208 may implement one or more radio circuits to transmit and receive radio communications by means of the antenna 216. The network interface 208 implements a physical layer (PHY) 218 in accordance with the Open Systems Interconnection (OSI) model of computer networking and a transmitter and receiver circuit (TX/RX) 220. Further, the network interface 208 implements a media access control layer (MAC) 222 in accordance with the OSI model.

In one embodiment, the network interface 208 implements the IEEE 802.11n protocol, including the 802.11n PHY and MAC layers. The network interface 208 may also or instead implement other data communication protocols for both wireless and wire line communication. For example, the network interface 208 may control communication to other wire line network elements such as network 110 of FIG. 1. In this regard, the network interface may implement protocols such as Ethernet or internet protocol (IP) for communication with other network elements.

The network interface 208 may include data processing circuits such as one or more processors, circuits, interfaces, modules and memory for implementing network control and communication. Moreover, the network interface 208 may include analog circuitry such as amplifiers, oscillators and filters for data communication with the antenna 216.

The antenna 216 may be any suitable device or combination of devices for transmission and reception of signals. In one example, the antenna 216 is a multiple-input, multiple-output (MIMO) antenna array for data communication. In one particular embodiment, the antenna 216 is configured for communication according to the IEEE 802.11 protocol at frequencies such as 2.4 GHz and 3.7 GHz and 5 GHz. Also, the antenna 216 may include multiple structures for communication of other signals such as GSM signals.

The GPS circuit 210 receives GPS signals or other location determination signals such as GLONASS signals. In response to the received location determination signals, the GPS circuit 210 determines geographic location of the access point 202. Also, in response to the received location determination signals, the GPS circuit 210 determines the current time with high precision. The GPS circuit 210 may communicate data about the geographic location of the access point and about the current time to other components of the access point 202, such as the timing circuit 212.

The timing circuit 212 controls timing of the access point 202. The timing circuit 212 may receive current time data and other timing information from the GPS circuit 210. In turn, the timing circuit 212 conveys timing information to other components of the access point 202. The timing information may include data defining the current time, clocking signals, alarm signals and other information. The access point 202 may include suitable means for data communication among its components such as data and control buses by which information such as timing information may be communicated.

The scheduler 214 operates to control timing of transmissions from the access point 202. The scheduler performs functions such as sorting of frames, deciding what frames may be aggregated and timing frame transmissions. In one exemplary embodiment to be described in greater detail below, the scheduler 214 evaluates propagation delays for respective stations being served by the access point 202. Using the propagation delays, the scheduler 214 determines if the difference between two or more propagation delays is large enough that the signal from one station will be completely received at the access point 202 before beginning the receipt of the signal from a subsequent station. If that condition is met, the scheduler 214 may conclude that these stations can be polled simultaneously in the same poll frame without any timing coordination of by the access point 202 and the stations.

The scheduler 214 may include any suitable combination of circuits, processors, interfaces, memory or code for performing the necessary functions. In the example of FIG. 2, the schedule 214 is a separate component of the access point 202. In some embodiments, however, the scheduler 214 may be implemented by other components such as the network interface 208 or the host processor 206.

The client device 204 includes a host processor 224, a network interface 226, an antenna 228 and a timing circuit 236. In other embodiments, the client device 204 may include other components providing other functionality. For example, in embodiments where the client device 204 is a mobile phone, the client device 204 includes a call processor circuit, a user interface and possibly other components such as a camera and accelerometers. In embodiments where the client device 204 is a portable computer, the client device 204 may include a keyboard, a display and a hard disk drive or other mass storage. In some embodiments, the client device 204 may be a module within a host device such as the portable computer or mobile phone.

The host processor 224 controls operation of the client device 204. The host processor 224 may include one or more circuits, modules, interfaces or code for implementing control functions. For example, the host processor 224 may include a microprocessor and memory. The memory may store data and instructions for controlling the microprocessor. The microprocessor in turn may operate in response to the stored data and instructions to control operation of the client device 204.

The network interface 226 controls data communication between the client device 204 and other devices, including the access point 202. The network interface 226 controls wireless communication using the antenna 228. In this regard, the network interface 226 may implement one or more radio circuits to transmit and receive radio communications by means of the antenna 228. In the illustrated embodiment, the network interface 226 implements a physical layer (PHY) 230 as well as a transmitter and receiver circuit (TX/RX) 232. Further, the network interface 226 implements a media access control layer (MAC) 234 in accordance with the OSI model. The network interface 226 forms a radio circuit for radio communication with a remote access point or other radio device.

In one embodiment, the network interface 226 implements the IEEE 802.11n protocol, including the 802.11n PHY layer 230 and MAC layer 234. In this regard, the client device 204 forms or is a part of an 802.11 station or STA. The network interface 226 may also or instead implement other data communication protocols for both wireless and wire line communication. For example, the network interface 226 may control communication to other components of the client device 204.

The network interface 226 may include data processing circuits such as one or more processors, circuits, interfaces, modules and memory for implementing network control and communication. Moreover, the network interface 226 may include analog circuitry such as amplifiers, oscillators and filters for communication with the antenna 228.

The antenna 228 may be any suitable device or combination of devices for transmission and reception of signals. In one example, the antenna 228 is a multiple-input, multiple-output (MIMO) antenna array for data communication. In one particular embodiment, the antenna 228 is configured for communication according to the IEEE 802.11 protocol at frequencies such as 2.4 GHz and 3.7 GHz and 5 GHz. Also, the antenna 228 may include multiple structures for communication of other signals such as GSM signals.

The timing circuit 236 maintains timing and synchronization information for the client device 204. In one example, the client device receives timing or synchronization information periodically from the access point 202. This information may come in the form of a beacon signal transmitted by the access point 202. A Timing Synchronization Function (TSF) is specified in the IEEE 802.11 standard to ensure timing synchronization among radio devices in a network. A Timing Synchronization Function (TSF) keeps timers for all stations in the same network synchronized. All stations including the client device 204 maintain a local TSF timer. In one example, the TSF is based on a 1-MHz clock with 1 microsecond increments.

Timing synchronization is achieved by stations periodically exchanging timing information through beacon frames. Each station adopts a received timing if it is later than the station's own TSF timer.

In operation, the access point 202 and client device 204 are in selective wireless data communication. The access point 202 operates as a base station and provides data communication in a service area adjacent to the access point 202 to client devices or stations such as the client device 204. Data communication is conducted according to a protocol such as IEEE 802.11. The access point 202 operates as a host or server to client devices such as the client device 204 in the service area and establishes a communication network for the stations in the service area.

The client device 204 seeks entry to the network established by the access point 202. Network insertion occurs when the client device 204 is powered up in the service area or first acquires signals from the access point 202. Network insertion involves acquisition of timing information by the client device 204 from the access point 202. Timing information may be conveyed by one or more beacon signals or beacons communicated by the access point 202. The beacon or beacons have a format and timing defined by the controlling network protocol such as 802.11. A beacon may include identification information for the access point 202 and timing and synchronization information. Reliable communication between the access point 202 and the client device 204 requires synchronization of timing between the access point 202 and the client device 204. The client device 204 may only communicate during permitted times, as defined by the network protocol. This is required to ensure that the client device 204 does not transmit at the same time as the access point 202 or at the same time as other client devices. One or more radios in the network transmitting on the same frequency or channel at the same time will prevent reliable communication due to clashing at the intended receiver.

Figure 3:
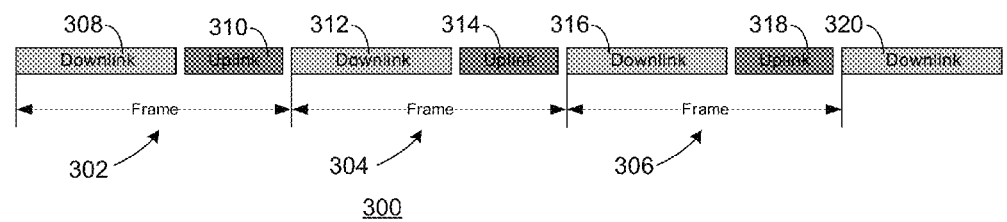
FIG. 3 is a timing diagram illustrating operation of the communication system of FIG. 1.

FIG. 3 is a timing diagram illustrating operation of the communication system 100 of FIG. 1. FIG. 3 illustrates a sequence 300 of time division duplex (TDD) frames for wireless communication in a communication system using a network protocol such as 802.11. In particular, the sequence 300 of frames has application in extended range networks such as 802.11n networks having a service area diameter greater than a few tens of meters.

The sequence 300 of frames includes a first frame 302, a second frame 304 and a third frame 306. In FIG. 3, time is on the horizontal axis. The first frame 302 includes a downlink 308 followed in time by an uplink 310. Similarly, the second frame 304 includes a downlink 312 followed in time by an uplink 314 and the third frame 306 includes a downlink 316 followed in time by an uplink 318. A subsequent downlink 320 indicates a following frame. Each respective downlink frame 308, 312, 316, 320 defines a time period when an access point such as the access point 108 (FIG. 1) transmits to stations or client devices in the service are of the access point. Each respective uplink frame 310, 314, 318 defines a time period when stations or client devices in the service area transmit to the access point. The composition and timing of each downlink or uplink is defined by the network protocol.

In order to scale up in size, a communication network such as the network formed by the access point 108 of FIG. 1 must synchronize its timing with other networks of the same technology or other technologies operating in the same frequency ranges. To synchronizing neighboring access points such as access points 102, 104, 106, 108, the network must operate in a time division duplex mode in which all neighbor access points transmit at the same time for a fixed duration, then switch to a receive mode for a fixed duration. This is done according to the sequence 300 of TDD frames of FIG. 3. During the downlink frames 308, 312, 316, 320, all access points 102, 104, 106, 108 transmit in synchrony. During the uplink frames, all access points 102, 104, 106, 108 receive in synchrony.

FIG. 4 is a timing diagram 400 illustrating operation of the communication system of FIG. 1. In FIG. 4, frame transmissions by the access point are shown above the horizontal line and frame transmissions by stations are shown below the horizontal line, with time extending to the right in the figure.

In FIG. 4, the downlink cycle 308 and the uplink 310 of FIG. 3 are shown in greater detail and referred to as downlink cycle 308 and uplink cycle 310. The downlink cycle 308 includes a clear to send (CTS) broadcast frame 402, a first media access control layer (MAC) protocol data unit (MPDU) frame 404, a second MPDU frame 406 and a third MPDU 408. As shown in the example of FIG. 4, the first A-MPDU frame 404 is transmitted by the access point for receipt by a first station designated STA1. Similarly, the second A-MPDU frame 406 is transmitted by the access point for receipt by a second station designated STA2. And still further, the third A-MPDU frame 404 is transmitted during the downlink cycle 308 by the access point for reception by a third station designated STA3. The access point may transmit as many A-MPDU frames are there are stations in the network.

An MPDU is a message or protocol data unit exchanged between MAC entities in a communication system. In the example, a MAC of the transmitting access point such as the MAC 222 of access point 202 communicates with MAC 234 of client device or station 204 in FIG. 2. In the illustrated example, the MPDU frames 404, 406, 408 are aggregated MPDUs. MPDUs may be aggregated in this manner to reduce overhead on the network and increase user level data rate. However, A-MPDU aggregation requires the use of block acknowledgement or BlockAck or BA. Using block acknowledgement, instead of transmitting an individual acknowledgement or Ack frame for every MPDU, multiple MPDUs can be acknowledged together using a single BA frame. Accordingly, the station designated STA1 acknowledges receipt of A-MPDU frame 404 by transmitting BA frame 410. Similarly, the station designated STA2 acknowledges receipt of A-MPDU frame 406 by transmitting BA frame 412. Further, the station designated STA3 acknowledges receipt of A-MPDU frame 408 by transmitting BA frame 414. After receiving each respective BA frame 410, 412, 414, the access point proceeds to serve the next station. A scheduler, such as scheduler 214 in FIG. 2, is responsible for selecting stations in the downlink cycle 308.

In the uplink cycle 310, the access point polls stations one at a time with a downlink message. A polled station responds by sending an A-MPDU or MPDU message with station data or by sending a null frame indicating that is has no data to send. Thus in FIG. 4, the uplink cycle includes a poll frame 420 transmitted by the access point for reception by the first station STA1, a poll frame 422 transmitted by the access point for reception by the first station STA1, and a poll frame 424 transmitted by the access point for reception by the first station STA1. The first station, STA1, responds to poll frame 420 with A-MPDU frame 430. The access point acknowledges receipt of the A-MPDU frame 430 by transmitting block acknowledge (BA) frame 440. The second station, STA2, responds to poll frame 422 with A-MPDU frame 432. The access point acknowledges receipt of the A-MPDU frame 432 by transmitting BA frame 442. The third station, STA2, responds to poll frame 424 with A-MPDU frame 434. The access point acknowledges receipt of the A-MPDU frame 434 by transmitting BA frame 444.

In the uplink cycle 310, the polling time of a station creates significant overhead. The poll frames 420, 422, 424 must be sent using the most reliable channel rate, which by default is a slow rate such as 52 bits per symbol. A 16 byte polling frame requires around 10 μsec+40 μsec (pre-amble)=50 μsec to poll each respective station. This number is augmented with 8 μsec to allow for short interframe spacing (SIFS). Thus the overhead of polling a station is approximately 58 μsec. Moreover, the overhead of polling stations grows linearly with the number of polled stations. For example, if the access point is to poll 30 stations in the same cycle, it will spend approximately 1.75 msec just polling stations. If the time allocated to the uplink cycle 310 is 2.5 msec, which is equal to 50% of a 5 msec frame, then the overhead for polling in the uplink cycle 310 can be as high as 70% for polling 30 stations.

In order to reduce the polling overhead an access point in accordance with some embodiments is operative to poll several stations simultaneously using the same polling frame. This is described in greater deal in conjunction with FIGS. 5 and 6.

FIG. 5 timing diagram illustrating operation of a conventional communication system. In particular, FIG. 5 illustrates structure of a conventional polling frame 500. The polling frame 500 may be in accordance with a communication protocol such as 802.11n, for example. The polling frame 500 includes several fields, as illustrated in FIG. 5. The polling frame 500 includes a frame control field 502, a duration field 504, a station (STA) media access control (MAC) address field 506 and a frame check sequence (FCS) 508.

The frame control field 502 identifies the form and the function of the polling frame 500. The communication protocol such as 802.11n defines possible values for the frame control field 502. Appropriate values are selected and populated in the frame control field 502 for reception and decoding by a receiver. A conventional frame control field 502 is further subdivided into sub-fields that identify the frame type, the protocol version and other information useful to the receiver. As shown in FIG. 5, the frame control field is 2 octets in length.

The duration field 504 includes duration information useful to the station receiving the frame 500. In one example the duration information includes data defining the amount of time allocated to the receiving station for uplink transfer of data. Other duration data may be included in addition or instead. As shown in FIG. 5, the duration field is 2 octets in length.

The station MAC address field 506 may include the address of the station receiving the polling frame 500. The station MAC address field 506 may also include the address of the access point transmitting the polling frame 500 as well as other information as well. As shown in FIG. 5, the conventional station MAC address is 6 octets in length.

The frame check sequence 508 is used to confirm the integrity of the polling frame 500. The FCS field 508 is appended to the polling frame 500 upon transmission of the polling frame 500 by the access point. Upon reception by the station, the station calculates the frame check sequence for the received frame and compares the calculated value with the transmitted value in the FCS field 508. If there is a match, the polling frame 500 was reliably received. As shown in FIG. 5, the FCS field 508 in the conventional polling frame 500 is 4 octets in length.

FIG. 6 is a timing diagram illustrating operation of the communication system of FIG. 1. More particularly, FIG. 6 illustrates a group polling frame 600 for improved group polling without a timing mechanism. The polling frame may be used to improve overhead and efficiency in a network by polling several stations with a single polling frame such as group polling frame 600.

The group polling frame 600 includes a frame control field 602, a frame check sequence (FCS) 604, and duration and address pairs for each station being polled with the group polling frame 600. The frame control field 602 may be the same as or similar to the frame control field 502 of the conventional polling frame 500 shown in FIG. 5. Similarly, the FCS field 604 may be the same in structure and operation as the conventional FCS field 508 shown in FIG. 5.

The duration and address pairs in the exemplary polling frame 600 include a first duration and address pair 606 and a second duration and address pair 608. The illustrated example is suitable when the polling frame 600 is being transmitted for polling two stations. In other examples, the group polling frame 600 will include more duration and address pairs, one for each station being polled.

Each duration and address pair 606, 608 includes a duration field and an address field. Thus, the first duration and address pair 606 includes a duration field 610 and an address field 612. These fields, taken together indicate that the station designated $STA_i$ having a MAC address defined by address field 612 should transmit according to the time duration specified in the duration field 610. Similarly, the station designated $STA_j$ having a MAC address defined by address field 616 should transmit according to the time duration specified in the duration field 614.

In order to be able to poll more than one station in the same group polling frame 600, the scheduler of the access point can make use of the locations of stations relative to the access point. The locations of the stations relative to the access point will affect the propagation delay of radio communications from each station to the access point. A station located near the access point will have a smaller propagation delay than a station more remote from the access point. The propagation delays may be different enough that the difference may be relied on by the access point when polling the stations with the group polling frame 600.

Specifically, if the difference in propagation delay between two or more stations and the access point is large enough such that the signal from one station will be completely received at the access point before the beginning of receipt of the signal from the second station, then these stations can be polled simultaneously in the same group polling frame 600 without any timing coordination between the access point and stations. This will be illustrated in greater will be illustrated below in conjunction with FIG. 9.

The access point controls timing for the network. The access point has a precise timing source in the form of a GPS circuit, although any other precision timing resource may be used. Propagation delay information for each respective station may be obtained in any suitable way. One method for determining propagation delay by each respective station and reporting that station's propagation delay will be illustrated below in conjunction with FIG. 10.

The following is a formal definition of the process of group polling of stations by an access point for a network including the access point and two stations. The definition may be readily extended to any suitable number of stations. Let a station designated $STA_i$ be located at distance $D_i$ from the access point, which is designated AP, and the propagation time to $STA_i$ is $Tp_i$. A station designated $STA_j$ is located at distance $D_j$ from the AP and the propagation time to $STA_j$ is $Tp_j$. Let the uplink time allocated to $STA_i$ be designated $U_i$ and the uplink time allocated to $STA_j$ be designated $U_j$. $STA_i$ and $STA_j$ can be polled using the same polling frame 600 if the following condition applies:

$$\text{If } ((2Tp_j - 2Tp_i > U_i + \text{overhead}) \text{ AND } (Tp_i < Tp_j)),$$

then $STA_i$ and $STA_j$ can be polled in the same frame.

Figure 7:
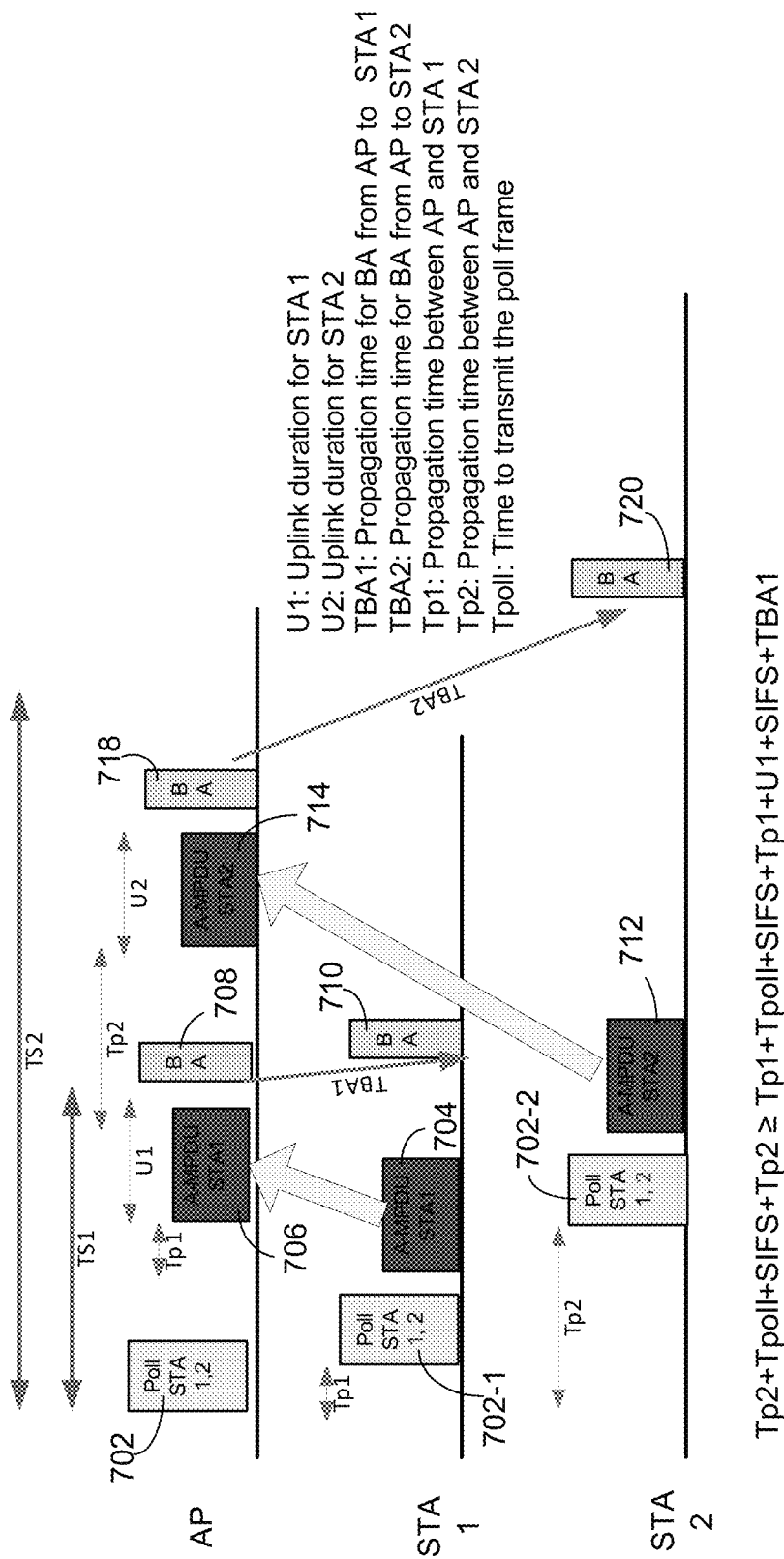
FIG. 7 timing diagram illustrating operation of the communication system of FIG. 1.

FIG. 7 is a timing diagram 700 illustrating operation of the communication system of FIG. 1. In particular, FIG. 7 provides a basis for informal proof of the condition above for application of group polling in an 802.11n network or other network and use of a group polling frame 600 of FIG. 6. FIG. 7 illustrates communication between an access point AP and a first station $STA_1$ and a second station $STA_2$. As noted above, the illustrated operation may be readily extended to any number of stations in communication with the access point. The only limitation on grouping stations into a polling frame group is the respective propagation delays from the respective stations to the access point.

Initially, the access point AP transmits a group polling frame 702. The time duration for transmitting the group polling frame 702 may be designated Tpoll. The group polling frame 702 may have the structure of group polling frame 600 of FIG. 6 including duration and address pairs for first station $STA_1$ and station $STA_2$. Other polling frame structures may be used in substitution for the polling frame illustrated in FIG. 6.

After a propagation delay time $Tp_1$, the first station $STA_1$ receives the group polling frame 702 transmitted by the access point AP. Upon reception, the received polling frame may be designated as group polling frame 702-1. The receiving station, first station $STA_1$, responds by transmitting a suitable response. In this case, the first station STA1 transmits a response frame designated A-MPDU STA1 704. The duration of the response frame 704 is designated $U_1$ and is set by the duration field for the station having the MAC address of the first station $STA_1$ in the group polling frame 702. In accordance with the communication protocol, timing for the transmission of the response message may be predefined. For example, in an 802.11 system, the short interframe space or SIFS defines the time between the data frame 702-1 and its acknowledgment, A-MPDU STA1 704.

After another propagation delay time $Tp_1$, the access point AP receives the response frame which is designated upon receipt as A-MPDU STA1 706. In response and in acknowledgment, the access point AP transmits a block acknowledge (BA) frame 708. After another propagation delay time $Tp_1$, the block acknowledge frame, designated upon receipt as BA frame 710, is received at the first station $STA_1$. In the illustrated example, the access point AP transmits the BA frame 708 at a SIFS time duration after receipt of the A-MPDU STA1 706. The propagation delay time of the BA frame 708 is designated $TBA_1$.

Meanwhile, after propagation delay time $Tp_2$, the second station $STA_2$ receives the group polling frame, designated upon receipt as group polling frame 702-2. In accordance with the protocol, the second station STA2 waits a SIFS time then transmits a response message, designated A-MPDU STA2 712. The duration of the response frame 712 is designated $U_2$ and is set by the duration field for the station having the MAC address of the second station $STA_2$ in the group polling frame 702. After another propagation delay time $Tp_2$, the access point AP receives the response message which is designated upon receipt as A-MPDU STA2 714. In response, after another SIFS time, the access point transmits a BA frame 718. The propagation delay time of the BA frame 718 is designated $TBA_2$. After another propagation delay time $Tp_2$, the response message, designated BA frame 720, is received at the second station $STA_2$.

Thus, as is shown in the example of FIG. 7, the response frame A-MPDU STA2 714 transmitted by second station $STA_2$ must be received at the access point AP after the receipt of the response message A-MPDU STA1 706 transmitted by the first station STA1 and the block acknowledgement frame 708 is transmitted from the access point AP to the first station STA1.

The total time for serving first station STA1 is given by $T_{S1}$, where $T_{S1}$ is given by:

$$T_{S1} = Tp1 + Tpoll + SIFS + Tp1 + U1 + SIFS + TBA1$$

And the total time for the data frame transmitted by STA2 to arrive at AP ($T_{S2}$), is given by:

$$T_{S2} = Tp2 + Tpoll + SIFS + Tp2$$

The necessary and sufficient condition for the data transmitted by stations not to cause interference for the data transmitted by first station STA1 is $$T_{S2} \geq T_{S1} \rightarrow Tp_2 + Tpoll + SIFS + Tp_2 \geq Tp_1 + Tpoll + SIFS + Tp_1 + U_1 + SIFS + TBA_1 \rightarrow \text{Condition 1: } 2Tp2 - 2Tp1 \geq U_1 + (SIFS + TBA_1)$$

If this condition holds, then first station STA1 and second station STA2 can be polled using the same group polling frame, thus saving one polling frame. In general, the scheduler of the access point AP may poll any two STAs using the same poll frame if condition 1 holds.

Condition 1 is now generalized to include multiple stations, designated (STA1, STA2, ... $STA_i$, ... $STA_n$) in the same group polling frame, where n is the number of stations in the network.

The scheduler may poll (n) stations using the same group polling frame if and only if $$(2Tp_j - 2Tp_i) \leq U_i + (SIFS + TBA_i), \text{ for } i=1 \ldots n, j=1 \ldots n, i \neq j \text{ and } Tp_i < Tp_j$$

The procedure may be described as follows:

First, build groups $G_i = \{STA_k\}$, where $i=1, \ldots$ n and $k=1 \ldots$ n such that condition 1 holds. The objective of the procedure is to minimize the number of groups, and to maximize the number of stations within each group. The complexity of the procedure for finding all groups (without any optimization) is $O(n^2)$.

In network with N stations, where each station is polled independently using one poll frame, the overhead for polling N stations is N*H. Using the group polling mechanism described herein, the overhead is reduced to G*H, where G is the number of groups with multiple stations polled at the same time.

The throughput for a single poll mechanism of the conventional sort described in conjunction with FIG. 5 is given by $$TH\_sngl = (T*U*N)/(U+H)*N,$$

where U is the useful time transmitting data and H is the overhead associated for polling a station, and T is the unit of time for measuring the throughput (e.g. 1000 msec). In a group polling mechanism of the sort described in conjunction with FIGS. 6 and 7, the throughput is given by $$TH\_grp = (T*U*N)/(UN+GH),$$

where GH is the total overhead for polling N stations in G groups. The throughput gain due to group polling is given by $$(TH\_grp - THsngl)/THgrp = [1 - (NU+GH)/(NU+NH)].$$

Figure 8:
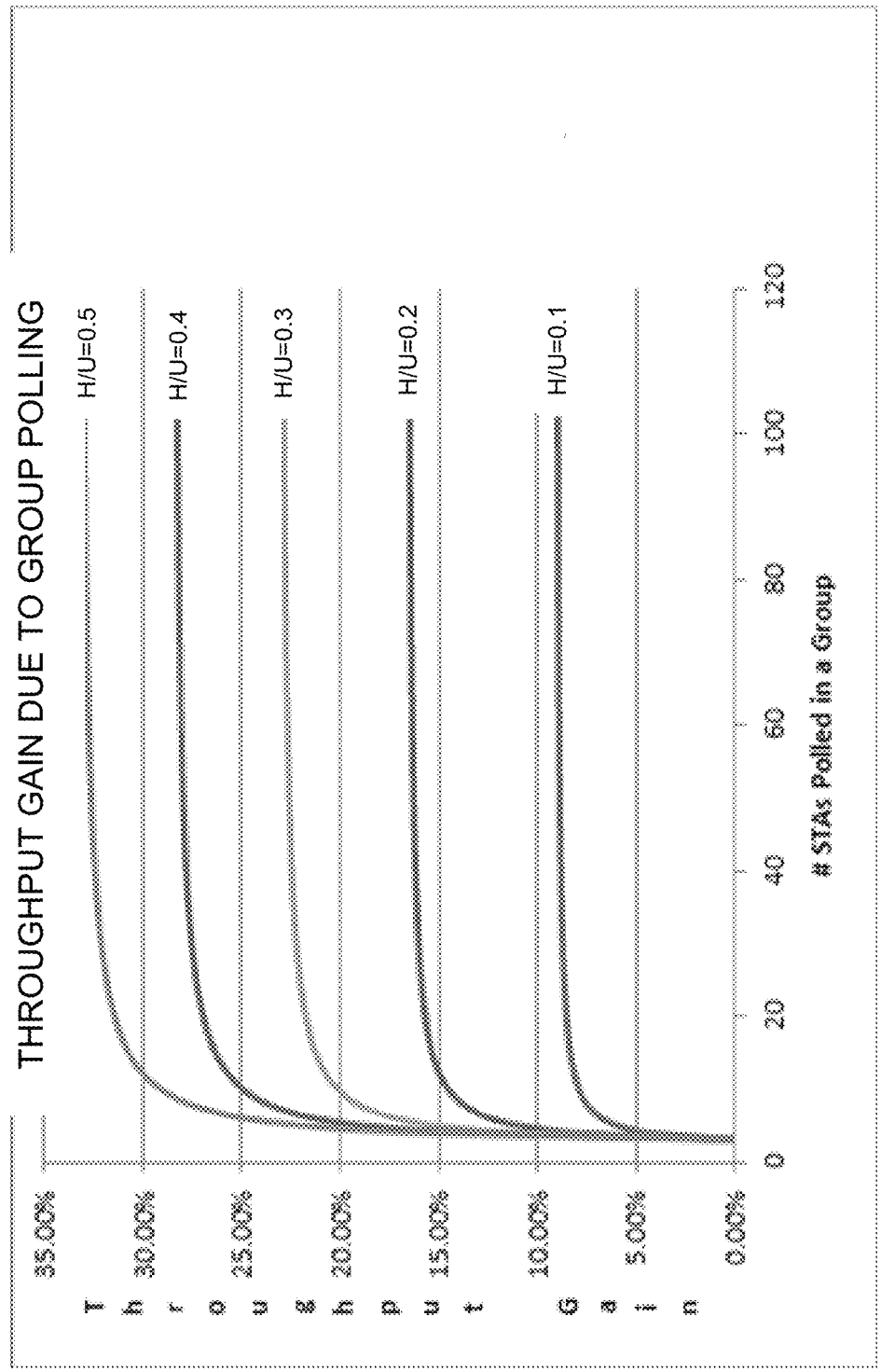
FIG. 8 illustrates the throughput gain afforded by the disclosed system and method.

Let the number G=N/k, where k is the average number of stations polled in each group. Then the throughput gain formula will become $1-[(KU+H)/(KU+KH)]$. FIG. 8 shows the throughput gain for different values of k and for 5 different overhead values relative to the useful uplink time.

Figure 9:
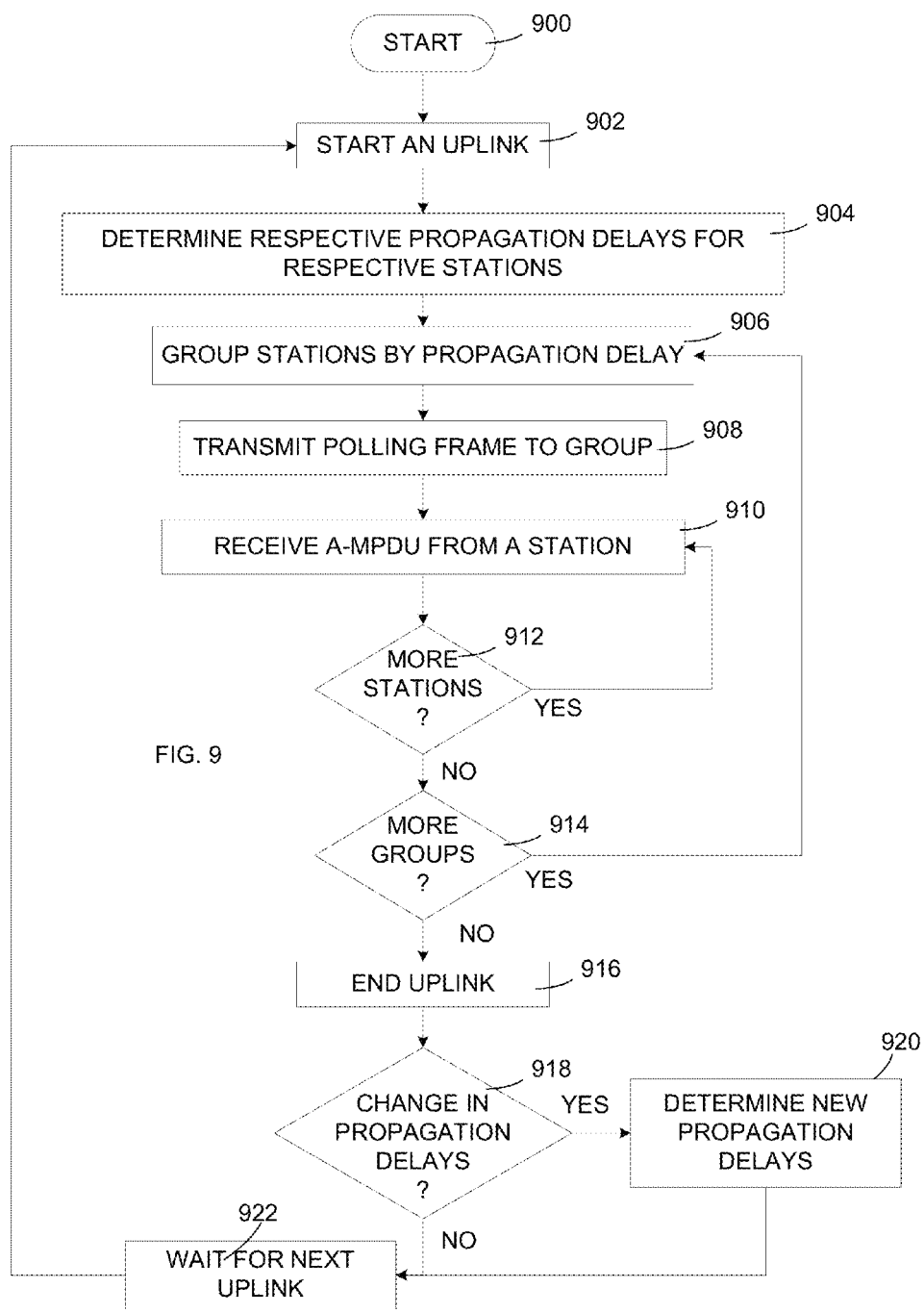
FIG. 9 is a flow diagram illustrating operation of the communication system of FIG. 1

FIG. 9 is a flow diagram illustrating a method for operating the communication system of FIG. 1. In particular, the illustrated method may be performed by an access point in an 802.11 network. The method begins at block 900. At block 902, the access point begins processing an uplink cycle during which data from stations of the network will be communicated to the access point.

Figure 10:
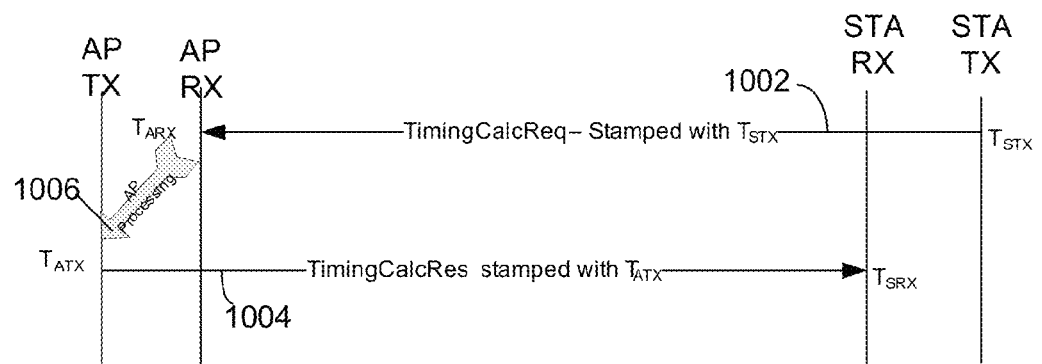
FIG. 10 is a flow diagram illustrating communication between an access point and a client device in a communication system.

At block 904, the access point determines respective propagation delays for respective stations. This may be done in any convenient manner, such as by reading stored data representative of the propagation delays from a memory. The data representative of the propagation delays may be determined by the access point or may be received from another source. FIG. 10 illustrates one example by which the respective stations determine and self-report their respective propagation delays to the access point.

At block 906, the access point groups the stations using the determined propagation delays. Grouping may be done according to any standard or process or using any criteria. In one exemplary process, the access point groups stations if the difference in propagation delay between two or more stations and the access point is large enough such that the signal from one station will be completely received at the access point before the beginning of receipt of the signal from the second station. If a grouping criterion is met for two or more stations, then these stations can be polled simultaneously in the same group polling frame without any timing coordination by the access point and the stations. Grouping polling of stations in a single group polling frame reduces the number of polling frames that must be sent and thereby reduces the polling overhead and traffic in the network.

At block 908, after identifying the stations of the group, the access point transmits a group polling frame to the stations of the group. At block 910, the access point receives an A-MPDU or other polling response message from a station. At block 912, the access point determines if there are more stations in the group to be heard from. If so, control returns to block 910 to await receipt of a subsequent A-MPDU.

If there are no more stations in the group, control proceeds to block 914. At block 914, the access point determines if there are more groups to process. If so, a next group is identified and control proceeds to block 906. At block 906, processing of the stations in the group begins by grouping the stations in the group according to their propagation delay. If at block 914, there are no more groups to process for the uplink, at block 916 uplink processing ends.

Following processing of the uplink, the access point may begin preparing for the following downlink. In some instances, control may proceed to block 918 where the access point determines if there has been a change in propagation delays from any of the stations in the network. A change in propagation delay may occur if a station moves relative to the access point. This may occur, for example, if the station is a mobile device such as a mobile phone or portable computer. If the movement is significant, the propagation delay may increase substantially or decrease substantially. If there is a change in the propagation delay, the grouping of the stations may need to be updated.

Accordingly, at block 920, if there is a change in propagation delays, the new propagation delays are determined. This may be done in any suitable manner, such as by responding to the self-reporting of the propagation delays by the stations. At block 922, the access point awaits the next uplink. Control returns to block 902 to begin processing a subsequent uplink.

FIG. 10 is a flow diagram illustrating communication between an access point and a client device in a communication system. FIG. 10 illustrates messages communicated between a station, on the right of FIG. 10, and an access point, on the left of FIG. 10. The process illustrated in FIG. 10 may be used in a system such as the system of FIG. 1 to determine respective propagation delays from the stations to the access point.

Two new messages may be used for communication between the station and the access point. A first message, TimingCalcReq, is a request message transmitted by the station to the access point to request information necessary for determining the propagation delay. A second message, TimingCalcRes, is a response message transmitted by the access point to the station in response to the timing calculation request message received from the station. The procedure of FIG. 10 may be triggered by any suitable system condition.

At step 1002, the station formats the TimingCalcReq message. In one embodiment, this message is a MAC frame. Further in this embodiment, the station transmits the message in a contention window. The contention window is a time period on the uplink sub-frame when stations with information to transmit may do so if no other station is transmitting. If another station is transmitting, the station waits a time interval before re-trying the transmission. Accordingly, at step 1002, the station attempts to transmit the TimingCalcReq message in accordance with contention window procedures.

In accordance with one embodiment, the station time stamps the TimingCalcReq message with the time of transmission of the message. This time may be obtained as the station's timing synchronization function (TSF) time when the transmission leaves the radio of the station. This time of transmission by the station of the request message may be labeled $T_{STX}$. The time stamp may be achieved in any suitable manner. In one embodiment, the time stamp is included in a data field of the TimingCalcReq message. The station's initial transmission is in a contention window that is offered by the access point periodically with a predefined duration larger than the time needed to transmit the TimingCalcReq frame using the lowest modulation and coding scheme.

The access point receives the request message from the transmitting station. Upon reception, the access point time stamps the TimingCalcReq message with its TSF time. The time or reception by the access point of the timing calculation request message may be labelled $T_{ARX}$.

At step 1006, the access point processes the timing calculation request message. Processing may include decoding the message, queuing the message for handling, and queuing a response for transmission to the station. In some instances, the processing time may be significant and non-zero.

At step 1004, the access point transmits a timing calculation response message. This message may be transmitted in a TimingCalcRes frame. The access point time stamps the response with its TSF time at the time of transmission of the timing calculation response message. The time when the access point transmits the response message may be labelled $T_{ATX}$. The access point includes in the TimingCalcRes frame the time $T_{ARX}$ when the access point received the TimingCalcReq message from the station as well as the transmit time of the TimingCalcReq message, labelled $T_{STX}$. Thus, the response message transmitted by the access point includes data defining three times: the time of transmission of the message by the station, $T_{STX}$; the time of receipt at the access point of the request message, labelled $T_{ARX}$; and the time of transmission of the response message, labelled $T_{ATX}$. Data defining these time values may be encoded and transmitted in the TimingCalcReq in any suitable manner, in any suitable data field for example.

Further in step 1004, the response message is received at the station which initially transmitted the request message. When the TimingCalcRes message is received by the station, the station records the time of reception of the message. This time may be labelled $T_{SRX}$. Thus, upon receipt of the TimingCalcRes message at the station, the station has the following timings that can be used to calculate the timing value: ($T_{STX}$), ($T_{SRX}$), ($T_{ATX}$) and ($T_{ARX}$).

The total turnaround time ($T_{TAT}$) of the timing calculation procedure at station is given by $$T_{TAT} = T_{SRX} - T_{STX}$$

$T_{TAT}$ in turn is equal to the time required to transmit the TimingCalcReq frame from the station to the access point and the time required to transmit the TimingCalcRes frame from the access point to the station, plus the processing and queuing time at the access point. The processing and queuing time is given by $(T_{ATX}-T_{ARX})$. Consequently, the following results:

$$T_{SRX}-T_{STX}=2*T_{PROP}T_{ATX}-T_{ARX}$$

Accordingly, the propagation delay ($T_{PROP}$) is given by $$T_{PROP}=\tfrac{1}{2}(T_{SRX}-T_{STX}-T_{ATX}+T_{ARX})$$

The propagation delay $T_{PROP}$ for a station is thus determined by the station. The station may then report its propagation delay to the access point for use in a group polling operation such as is illustrated in FIGS. 7 and 9. The propagation delays may be determined any other suitable manner.

In another embodiment, the scheduler of the access point may use a group poll frame where several stations are specified in the same frame and each station computes the exact time at which it must begin transmission. This approach uses a time-based deterministic approach, and depends on the ability of the scheduler at the access point to exactly specify the beginning of the uplink cycle. The start of the uplink cycle must be computed for each frame, and this time varies from one frame to another. The proposed approach relies on a fixed data, i.e., the distance of the stations to the access point, which remains static for a long time duration. However other solutions do not take advantage of reducing the need to include every turn-around time for every station transmission and reception.

The proposed idea is particularly applicable when the stations are dispersed widely from the access point such that there is a significant difference between the propagation delays of stations and the access point. In a relatively small cell size network, where the variation in propagation delays is too small, the group poll based on the distance variation will not be as efficient.

Another relative inefficiency is related to the ratio between the overhead due to polling and the overall uplink time. If the ratio is relatively low (e.g. less than 10%), then the gain achieved by eliminating some poll frames is less than 10%. This is particularly true when stations upload large files such as video files, where the polling overhead is relatively small compared to the data transfer time of the large files.

However, when the stations are relatively idle and the vast majority of their uplink time is the transfer of acknowledgment packets, the relative polling overhead will be very high. In this case, group polling will significantly improve the uplink performance.

It is therefore intended that the foregoing detailed description be regarded as illustrative rather than limiting, and that it be understood that it is the following claims, including all equivalents, that are intended to define the spirit and scope of this invention.

The invention claimed is:

1. A method comprising:
   at an access point in wireless data communication with two or more stations;
   grouping the two or more stations according to propagation delay of radio transmissions from each respective station to the access point into two or more groups such that a difference in respective propagation delays between two or more respective stations in a group is large enough that a respective data transmission from one respective station will be completely received at the access point before beginning of receipt of a respective data transmission from another respective station;
   transmitting a single polling frame to a group of stations; and
   receiving respective data transmissions from respective stations of the plurality of stations in the group at respective times.

2. The method of claim 1 further comprising:
   receiving from the respective stations information about the respective propagation delays for each of the respective stations.

3. The method of claim 1 wherein transmitting a single polling frame comprises:
   transmitting, in the single polling frame, a respective assigned duration field and a respective address field for each station of the plurality of stations.

4. The method of claim 3 further comprising:
   determining propagation delays for transmissions from respective stations of the plurality of stations;
   selecting a first station and a second station such that a difference in respective propagation delays between the first station and the second station is large enough so that a data transmission from the first station will be completely received at the access point before beginning of receipt of a data transmission from the second station;
   based on the respective propagation delays, assigning transmission duration values for the first station;
   formatting a polling frame including a first duration field populated with a first transmission duration value for the first station, a first address field populated with the medium access control (MAC) address of the first station, a second duration field populated with a second transmission duration value for the second station and a second address field populated with the MAC address of the second station; and
   transmitting the polling frame for reception by both the first station and the second station.

5. The method of claim 1 wherein receiving respective data transmissions from respective stations comprises:
   receiving a MAC protocol data unit (MPDU) transmission from the first station in accordance with the first transmission duration value; and
   receiving a MPDU transmission from the second station in accordance with the second transmission duration value.

6. The method of claim 1 further comprising:
   receiving from the respective stations of the two or more stations information about the respective propagation delays of radio transmissions from each of the respective stations;
   grouping the two or more stations into two or more groups using the respective propagation delays; and
   transmitting a respective single polling frame to stations of each respective group of the two or more groups.

7. The method of claim 6 further comprising:
   at the access point, receiving a timing request message transmitted by a station;
   determining a request message receipt time for the reception of the timing request message at the access point;
   extracting request message transmission time data from the timing request message transmitted by the station;
   formatting a response message with the request message transmission time data, request message receipt time data corresponding to the determined request message receipt time and response message transmission time data corresponding to a transmission time for the response message; and transmitting the response message for reception by the station; and subsequently, receiving from the station information about the propagation delay of radio transmissions from the station determined using the information formatted in the response message.

8. The method of claim 6 further comprising:

receiving from one or more stations information about a changed propagation delay for the one or more stations;

using the information about the changed propagation delay, regrouping the two or more stations into new groups; and transmitting subsequent polling frames to stations of respective new groups.

9. An access point comprising:

a network interface operative for radio communication with a plurality of stations in a service area;

a scheduler operative to control radio communication of the network interface, the scheduler operative to:
   determine information defining respective propagation delays for each respective station of the plurality of stations;
   using the respective propagation delays, group the respective stations into two or more groups of stations such that a single polling frame can be sent to all stations of a respective group of stations to cause the respective stations of the respective group to respond to the single polling frame by transmitting respective transmissions so that the respective transmissions are received at the network interface at independent times; and
   cause the network interface to transmit the single polling frame for each respective group of stations.

10. The access point of claim 9 further comprising:

a memory in data communication with the scheduler to store data defining the respective propagation delays for each respective station of the plurality of stations.

11. The access point of claim 10 wherein the network interface is operative to receive transmissions from the respective stations reporting respective propagation delays and to store the data defining the respective propagation delays in the memory.

12. The access point of claim 11 wherein the network interface is operative to communicate message timing information with a station to enable the station to determine the respective propagation delay for the station.

13. The access point of claim 12 wherein the network interface is operative to:
   receive a timing request message transmitted by the station;
   determine a request message receipt time for the reception of the timing request message at the access point;
   extract request message transmission time data from the timing request message transmitted by the station;
   format a response message with the request message transmission time data, request message receipt time data corresponding to the determined request message receipt time and response message transmission time data corresponding to a transmission time for the response message; and
   transmit the response message for reception by the station and subsequent calculation of the respective propagation delay for the station.

14. An access point comprising:

a network interface operative for radio communication with a plurality of stations in a service area;

a media access control layer operative to format a group polling frame for transmission to two or more selected stations of the plurality of stations;

a scheduler operative to control radio communication of the network interface, the scheduler operative to:
   receive information defining propagation delays for radio communication between the access point and respective stations,
   select the two or more stations for receipt of the group polling frame, such that a difference in respective propagation delays between the two or more stations is large enough so that a data transmission from one of the two or more stations will be completely received at the access point before beginning of receipt of a data transmission from another of the two or more stations; and
   initiate transmission of the group polling frame by the network interface.

15. The access point of claim 14 wherein the network interface is operative to receive from the respective stations radio transmissions including data defining respective propagation delays for the respective stations.

16. The access point of claim 15 wherein the scheduler is responsive to the information defining propagation delays to assign the respective stations to two or more groups such that a difference in respective propagation delays between two or more respective stations is large enough so that a respective data transmission from one respective station will be completely received at the access point before beginning of receipt of a respective data transmission from another respective station.

17. The access point of claim 16 wherein the network interface is operative to receive from the respective stations radio transmissions including data defining updated respective propagation delays for one or more respective stations, and wherein the scheduler is responsive to the updated respective propagation delays to reassign the respective stations to two or more updated groups to reflect changes in the service area.

* * * * *